US007116938B2

(12) United States Patent
Monroe et al.

(10) Patent No.: US 7,116,938 B2
(45) Date of Patent: Oct. 3, 2006

(54) METHOD AND APPARATUS FOR MITIGATING RADIO FREQUENCY INTERFERENCE BETWEEN TRANSCEIVER SYSTEMS

(75) Inventors: Robert L. Monroe, Colorado Springs, CO (US); Randolph L. Durrant, Colorado Springs, CO (US); Krishnan Rajamani, San Diego, CA (US); Gordon Chinn, San Jose, CA (US); James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 10/329,958

(22) Filed: Dec. 26, 2002

(65) Prior Publication Data
US 2004/0162106 A1 Aug. 19, 2004

Related U.S. Application Data

(63) Continuation-in-part of application No. 10/218,401, filed on Aug. 14, 2002.

(51) Int. Cl.
*H04B 7/00* (2006.01)

(52) U.S. Cl. ............... 455/41.2; 455/435.1; 455/435.2; 455/450; 455/455; 455/550.1; 455/552.1; 455/553.1; 370/338; 370/345; 370/466

(58) Field of Classification Search ............ 455/435.1, 455/435.2, 450, 455, 550.1, 552.1, 553.1, 455/41.2; 370/338, 348, 466; 375/130, 375/132, 140
See application file for complete search history.

(56) References Cited

U.S. PATENT DOCUMENTS

| 6,326,926 | B1 | 12/2001 | Shoobridge et al. |
| 6,590,928 | B1 * | 7/2003 | Haartsen ............ 375/134 |
| 6,628,927 | B1 * | 9/2003 | Samuels ............ 455/77 |
| 6,697,415 | B1 | 2/2004 | Mahany |
| 2001/0051530 | A1 | 12/2001 | Shiotsu et al. |
| 2002/0061031 | A1 * | 5/2002 | Sugar et al. ........ 370/466 |
| 2002/0062385 | A1 | 5/2002 | Dowling |
| 2002/0067696 | A1 * | 6/2002 | Ho ................ 370/235 |
| 2002/0136184 | A1 * | 9/2002 | Liang et al. ........ 370/338 |
| 2002/0167931 | A1 * | 11/2002 | Jang et al. ......... 370/348 |
| 2002/0191677 | A1 * | 12/2002 | Chen et al. ........ 375/132 |
| 2003/0026198 | A1 * | 2/2003 | Diepstraten et al. .... 370/208 |

FOREIGN PATENT DOCUMENTS

| EP | 1 052 867 A1 | 11/2000 |
| EP | 1 220 499 A2 | 7/2002 |
| WO | WO-96/38925 A1 | 12/1996 |
| WO | WO-00/64107 A1 | 10/2000 |

OTHER PUBLICATIONS

"International Search Report," PCT/US03/24343, dated Sep. 23, 2004.
"European Search Report," EP 03 01 8488, dated Sep. 15, 2004.
International Preliminary Examination Report for International (PCT) Patent Application No. PCT/US03/24343, dated Apr. 1, 2005.

* cited by examiner

*Primary Examiner*—Steve M. D'Agosta
(74) *Attorney, Agent, or Firm*—Marshall, Gerstein & Borun LLP

(57) ABSTRACT

Methods and apparatus are disclosed for mitigating radio frequency interference between transceiver systems within an electronic device.

42 Claims, 15 Drawing Sheets

*FIG. 11*

| Four-Bit Channel Code | Center Frequency |
|---|---|
| 0000 | 802.11b off air |
| 0001 | 802.11b channel 1 | 2.412 GHz |
| 0010 | 802.11b channel 2 | 2.417 GHz |
| 0011 | 802.11b channel 3 | 2.422 GHz |
| 0100 | 802.11b channel 4 | 2.427 GHz |
| 0101 | 802.11b channel 5 | 2.432 GHz |
| 0110 | 802.11b channel 6 | 2.437 GHz |
| 0111 | 802.11b channel 7 | 2.442 GHz |
| 1000 | 802.11b channel 8 | 2.447 GHz |
| 1001 | 802.11b channel 9 | 2.452 GHz |
| 1010 | 802.11b channel 10 | 2.457 GHz |
| 1011 | 802.11b channel 11 | 2.462 GHz |
| 1100 | 802.11b channel 12 | 2.467 GHz |
| 1101 | 802.11b channel 13 | 2.472 GHz |
| 1110 | 802.11b channel 14 | 2.484 GHz |
| 1111 | Reserved |

METHOD AND APPARATUS FOR MITIGATING RADIO FREQUENCY INTERFERENCE BETWEEN TRANSCEIVER SYSTEMS

CROSS REFERENCE TO RELATED APPLICATION

This application is a continuation-in-part (CIP) application claiming priority from U.S. patent application Ser. No. 10/218,401, entitled "Methods and Apparatus for Communicating via a Radio Channel" filed Aug. 14, 2002.

TECHNICAL FIELD

The present disclosure relates generally to wireless communication systems, and, more particularly, to a method and apparatus for mitigating radio frequency interference between transceivers.

BACKGROUND

Typically, standard local area network (LAN) protocols such as Ethernet provide access to network resources through wired, land line connections within a small geographic area (e.g., within an office building). However, until recently, LANs were limited to the conventional wired network connections. To increase mobility and flexibility, the concept of wireless LANs (i.e., WLANs) has been introduced. That is, WLANs provide convenient access to network resources for portable computers (e.g., a laptop computer) and handheld devices (e.g., a personal digital assistant (PDA)) both in and out of the office via an access point. In particular, the 802.11 communication protocol developed by the Institute of Electrical and Electronics Engineers (i.e., the IEEE 802.11 standard, IEEE std. 802.11-1997, published 1997) provides a standard for WLANs for wireless transmissions using spread spectrum radio frequency (RF) signals in the 2.4 gigahertz (GHz) Industrial, Scientific, and Medical (ISM) frequency band. The 802.11 communication protocol offers wireless transmission at rates of either one megabits per second (1 Mbps) or two megabits per second (2 Mbps) to access wired LANs. Based on the 802.11 communication protocol, the 802.11b communication protocol (i.e., IEEE 802.11b standard, IEEE std. 802.11b-1999, published 1999, which is also known as Wi-Fi or Wireless Ethernet) may extend the rate to 11 Mbps. The 802.11b communication protocol may also increase the RF coverage up to approximately 500 feet. Despite enhancing the ability of an electronic device to access a LAN (e.g., for web browsing and e-mail), the 802.11b communication protocol may not be optimal for establishing a wireless connection with devices in a wireless personal area network (WPAN) such as computers, cellular telephones, personal digital assistants (PDAs), and other peripherals such as a mouse. That is, a disadvantage of the 802.11b communication protocol is that a transceiver system (i.e., a radio system) operating in accordance with the 802.11b communication protocol may use an unnecessary amount of power to communicate with WPAN devices.

It is widely known that the Bluetooth communication protocol also uses short-range radio links to replace physical cables connecting between portable and/or fixed electronic devices. Like the 802.11b communication protocol, the Bluetooth communication protocol also operates in the unlicensed 2.4 gigahertz (GHz) ISM frequency band for short-range wireless connection between computers, cellular telephones, cordless telephones, PDAs, local area networks (LANs) and other peripherals such as printers, mice, and facsimile machines. In particular, the Bluetooth communication protocol may be used in wireless personal access networks (WPANs) because it requires less power than the 802.11b communication protocol. For example, a laptop notebook may be able to synchronize with a PDA, to transfer files with a desktop computer and/or another laptop notebook, to transmit or to receive a facsimile, and to initiate a print-out of a document. Thus, an advantage of the Bluetooth communication protocol is that the protocol is more robust to communicate with WPAN devices than the 802.11b communication protocol. However, a transceiver system operating in accordance with Bluetooth communication protocol may not be able to operate at sufficient power, range, and speed to access a LAN.

As noted above, both the 802.11b communication protocol and the Bluetooth communication protocol operate in the 2.4 GHz ISM frequency band. That is, the channels used by 802.11b transceiver system and the Bluetooth transceiver system may interference with each other. Thus, collision may occur when the 802.11b transceiver system and the Bluetooth transceiver system are communicating at the same time (e.g., the Bluetooth transceiver system may cause interference to the 802.11b transceiver system).

BRIEF DESCRIPTION OF THE DRAWINGS

FIG. 11 is a table of four-bit channel codes indicative of radio channels.

DETAIL DESCRIPTION

Although the methods and apparatus disclosed herein are particularly well suited for use with a laptop computer including a transceiver system operating in accordance with the 802.11b communication protocol and a transceiver system operating in accordance with the Bluetooth communication protocol, persons of ordinary skill in the art will readily appreciate that the teachings herein are in no way limited to laptop computers. On the contrary, persons of ordinary skill in the art will readily appreciate that the teachings of this disclosure can be employed with any electronic device such as a handheld computer, a cellular telephone, and a personal digital assistant (PDA) regardless of the wireless communication protocols it employs.

Figure 1:
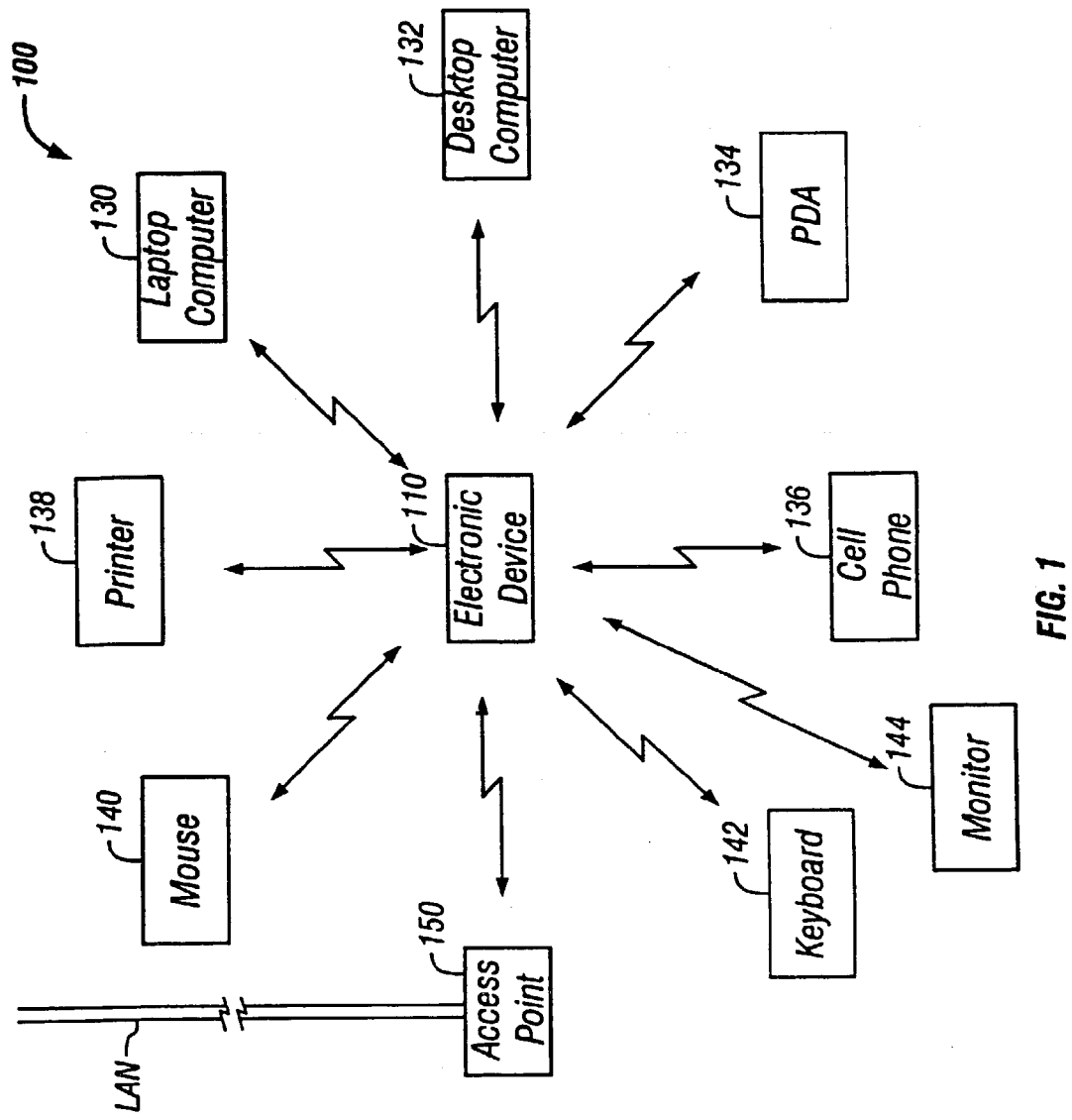
FIG. 1 is a schematic illustration of an example wireless communication system.

FIG. 1 is a schematic illustration of an example wireless communication system 100. In the wireless communication system 100, an electronic device 110 such as a portable computer may be in communication with other portable or fixed electronic devices such as, but not limited to, a laptop computer 130, a desktop computer 132, a personal digital assistant (PDA) 134, a cellular telephone 136, and a printer 138. Although in the illustrated example, the electronic device 110 is shown as a portable computer, persons of ordinary skill in the art will appreciate that the electronic device 110 may be, but is not limited to, a laptop computer, a notebook computer, a personal digital assistant (PDA), a cellular telephone, etc. As used herein "portable computer" refers to any computer (e.g., a laptop computer, a notebook computer) that is designed to be carried by a person. The electronic device 110 may also be in communication with a human interface device (HID) such as, but not limited to, a mouse 140, a keyboard 142, and a monitor 144. Further, the electronic device 110 may be in communication with an access point 150 operatively coupled to a local area network (LAN) to access, for example, the Internet, the Intranet, and other servers.

Figure 2:
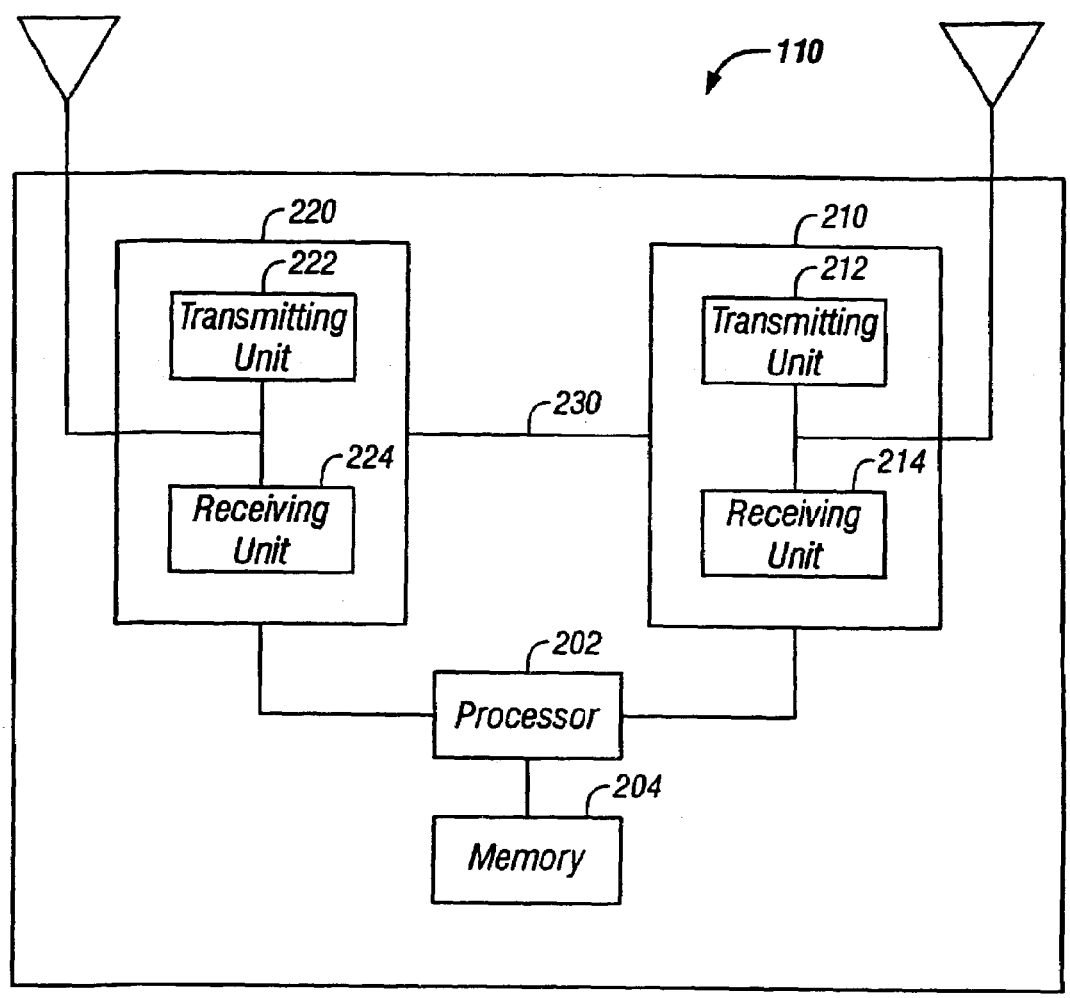
FIG. 2 is a more detailed view of the electronic device of FIG. 1.

As explained in detail below, the illustrated electronic device 110 generally includes a first transceiver system and a second transceiver system operable for wireless communication with other electronic devices or networks in a wireless personal access network (WPAN) and a wireless local area network (WLAN). One possible implementation of the electronic device 110 is shown in FIG. 2. As shown in that figure, the electronic device 110 generally includes a processor 202, a memory 204, a first transceiver system 210 and a second transceiver system 220. The processor 202 is operatively coupled to the memory 204, which stores a computer program as described in detail below or a set of operating instructions for the processor 202. Accordingly, the processor 202 executes the program or the set of operating instructions such that the electronic device 110 operates to provide the environments reflected in FIG. 1. The program or set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media.

The processor 202 is also operatively coupled to the first transceiver system 210 and the second transceiver system 220. The first transceiver system 210 may be operatively coupled to the second transceiver system 220 via a communication link 230. For example, the first transceiver system 210 may be in communication with the second transceiver system 220 via a communication bus. In another example, the first transceiver system 210 may be directly wired to the second transceiver system 220 (i.e., a hardwire link). Alternatively, the communication link 230 may be a wireless link such as a radio frequency link or an infrared link. Each of the first and second transceiver systems 210, 220 may include, but is not limited to, a transmitting unit generally shown as 212 and 222, and a receiving unit generally shown as 214 and 224. The transmitting unit 212 and the receiving unit 222 may be configured as multiple units as shown in FIG. 2 or be configured as a single (e.g., integral or unitary) unit.

As noted above, the first and second transceiver systems 210, 220 may provide wireless communication services to the electronic device 110. To illustrate the concept of communicating via a radio channel, the first transceiver system 210 may operate in accordance with a first wireless communication protocol, and the second transceiver system 220 may operate in accordance with a second wireless communication protocol. For example, the first wireless communication protocol may be, but is not limited to, the Institute of Electrical and Electronics Engineers (IEEE) 802.11b communication protocol (the IEEE standard 802.11b for "High Rate" Wireless Local Area Network), and the second wireless communication protocol may be, but is not limited to, the Bluetooth communication protocol. Accordingly, the first transceiver system 210 may operate in accordance with the IEEE 802.11b communication protocol (hereinafter "802.11b transceiver system"), and the second transceiver system 220 may operate in accordance with the Bluetooth communication protocol (hereinafter "Bluetooth transceiver system"). Both the 802.11b transceiver system 210 and the Bluetooth transceiver system 220 may be operable to communicate with other devices and/or networks via radio channels. Persons of ordinary skill in the art will readily appreciate that the 802.11b transceiver system 210 and the Bluetooth transceiver system 220 may use well known direct sequence spread spectrum (DSSS) and frequency hopping spread spectrum (FHSS) algorithms, respectively, to select radio channels for communication.

Accordingly, to provide short range ad-hoc connections between devices in WPANs and connections to WLANs, two transceiver systems operating in accordance with different communication protocols may be integrated into an electronic device. For example, a laptop notebook may include two transceiver systems with one transceiver system operating in accordance with the 802.11b communication protocol (i.e., 802.11b transceiver system) and the other transceiver system operating in accordance with the Bluetooth communication protocol (i.e., Bluetooth transceiver system). The 802.11b transceiver system uses a direct sequence spread spectrum (DSSS) modulation technique whereas the Bluetooth transceiver system uses a frequency hopping spread spectrum (FHSS) modulation technique. In particular, the DSSS modulation technique spreads data transmissions across 22 MHz segments of the entire available frequency band in a prearranged scheme. Within the 2.4 GHz frequency band, the 802.11b communication protocol defines 14 "center frequency channels" with channels 1 through 11 supported within the United States, and channels 12 through 14 supported outside the U.S. In particular, channel 1 at 2.412 GHz, channel 6 at 2.437 GHz, and channel 11 at 2.462 GHz are the more commonly used non-overlapping channels. Channels 1, 6, and 11 are spaced apart by 25 MHz. The 802.11b communication protocol may also be configured to provide six overlapping channels spaced 10 MHz apart. Typically, the DSSS modulation technique uses one channel and spreads data transmissions across a twenty-two megahertz band (i.e., a bandwidth of 22 MHz). Further, the 802.11b transceiver system may encode data with a code known only to certain 802.11b transceiver systems so that data transmissions may not be as susceptible for intruders to intercept and decipher. With FHSS modulation technique, the Bluetooth transceiver system is synchronized to hop from channel to channel in a predetermined pseudorandom sequence known only to certain Bluetooth transceiver systems. The Bluetooth communication protocol includes up to 79 narrow channels with each channel having a one megahertz band (i.e., a bandwidth of 1 MHz in between 2.4 and 2.484 GHz). Typically, the FHSS modulation technique uses a majority of the channels and hops between the channels for data transmissions. As a result, the 802.11b transceiver system may be used for WLAN communication, and the Bluetooth transceiver system may be used for WPAN communication.

A basic flow for scheduling communication via a radio channel that may be applied with the electronic device 110 shown in FIGS. 1 and 2 may start with the Bluetooth transceiver system 220 selecting a radio channel for communication (i.e., a selected radio channel). As used herein "communication" refers to any transmission and/or reception of a signal. For example, the selected radio channel may be used by the Bluetooth transceiver system 220 for transmitting a file to a desktop computer and/or receiving a command from a mouse. Persons of ordinary skill in the art will appreciate that selection of a radio channel may be implemented in many ways. For example, the Bluetooth transceiver system 220 may use a well known frequency hopping spread spectrum (FHSS),algorithm to select the radio channel for communication (e.g., an FHSS channel). The Bluetooth transceiver 220 may receive an 802.11b operating signal from the 802.11b transceiver system via the communication link 230. The 802.11b operating signal may include channel information indicative of the DSSS channel such as, but not limited to, a reference corresponding to a radio channel for communication associated with the 802.11b transceiver system 210 (e.g., a DSSS channel), an operating mode of the DSSS channel (e.g., active or inactive), and a priority level of communication associated with the 802.11b transceiver system 210 (e.g., low or high) via the DSSS channel. As used herein "DSSS channel" refers to any radio channel selected by the 802.11b transceiver system 210 to communicate with other electronic devices or networks in the wireless communication system 100 such as an access point (one shown as 150 in FIG. 1) or other 802.11b client via the ad hoc mode. Thus, the reference corresponding to the DSSS channel may be, but is not limited to, a letter, an alphanumeric character, and a number such as channel 1, channel 6, and channel 11 of any well known DSSS algorithm. The operating mode indicates whether the 802.11b transceiver system 210 is using and/or is intending to use the DSSS channel for communication. The priority level indicates whether the communication associated with the 802.11b transceiver system 210 via the DSSS channel has higher priority over the communication associated with the Bluetooth transceiver system 220 via the FHSS channel.

Figure 3:
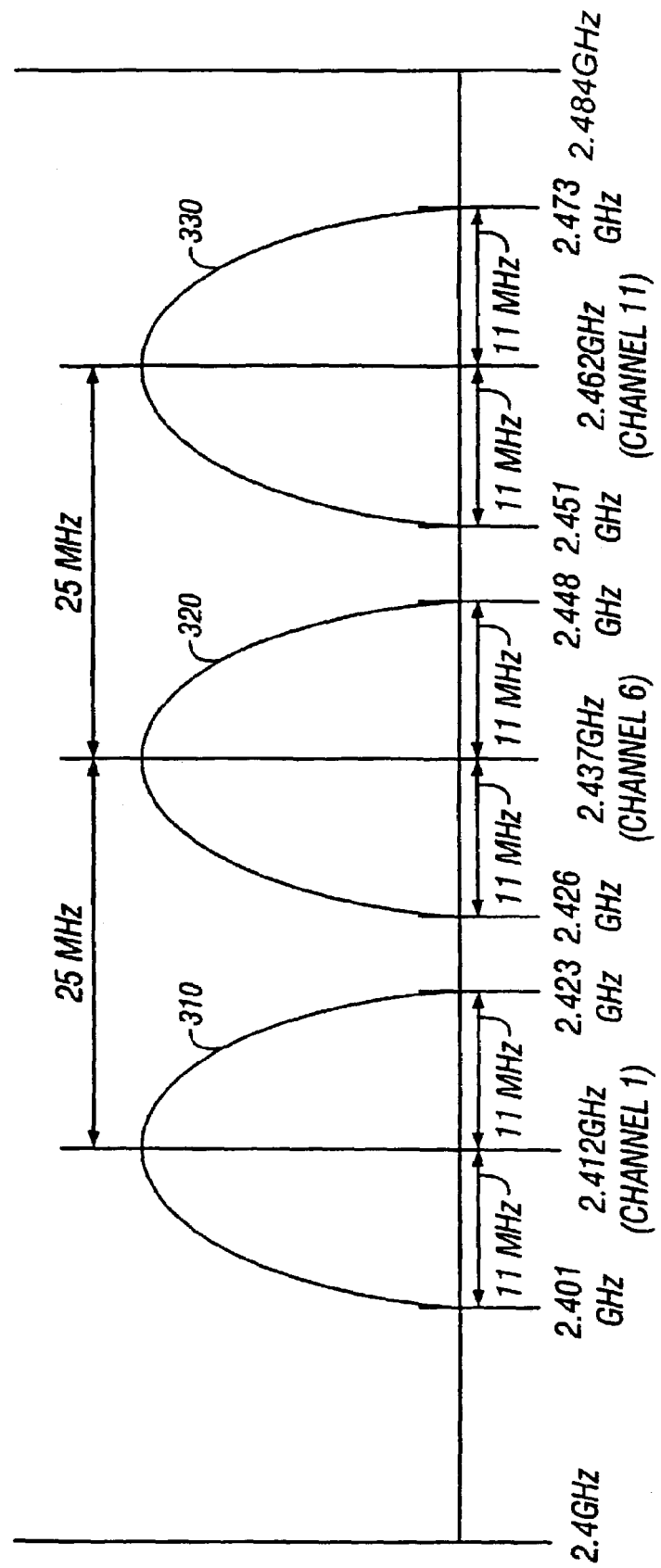
FIG. 3 is a schematic illustration of example direct sequence spread spectrum (DSSS) channels.

Based on the channel information provided by the 802.11b transceiver system 210, the electronic device 110 (e.g., via the Bluetooth transceiver system 220) determines whether the FHSS channel may be available for communication associated with the Bluetooth transceiver system 220 without causing radio interference between the FHSS channel and the DSSS channel. That is, the electronic device 110 determines whether the FHSS channel is in an interference zone of the DSSS channel (i.e., the frequency band of the FHSS channel is within, overlaps, adjacent to or substantially proximate to the frequency band of the DSSS channel) based on the reference corresponding to the DSSS channel. As noted above, persons of ordinary skill in the art will appreciate that the 802.11b transceiver system may use a DSSS algorithm to select the DSSS channel. Referring to FIG. 3, for example, the DSSS algorithm may provide the 802.11b transceiver system with three non-overlapping DSSS channels (i.e., channels, 1, 6, and 11) generally shown as 310, 320, and 330. The three non-overlapping channels are spaced 25 MHz apart in the 2.4 gigahertz (GHz) Industrial, Scientific, and Medical (ISM) frequency band (i.e., between 2.4 and 2.484 GHz). Each of the three non-overlapping channels has a bandwidth of 22 MHz. In particular, channel 1 at 2.412 GHz extends from 2.401 to 2.423 GHz (shown as 310), channel 6 at 2.437 GHz extends from 2.426 to 2.448 GHz (shown as 320), and channel 11 at 2.462 GHz extends from 2.451 to 2.473 GHz (shown as 330). Alternatively, the 802.11b transceiver system may be configured to operate any of the fourteen channels available for the 802.11b communication protocol.

Figure 4:
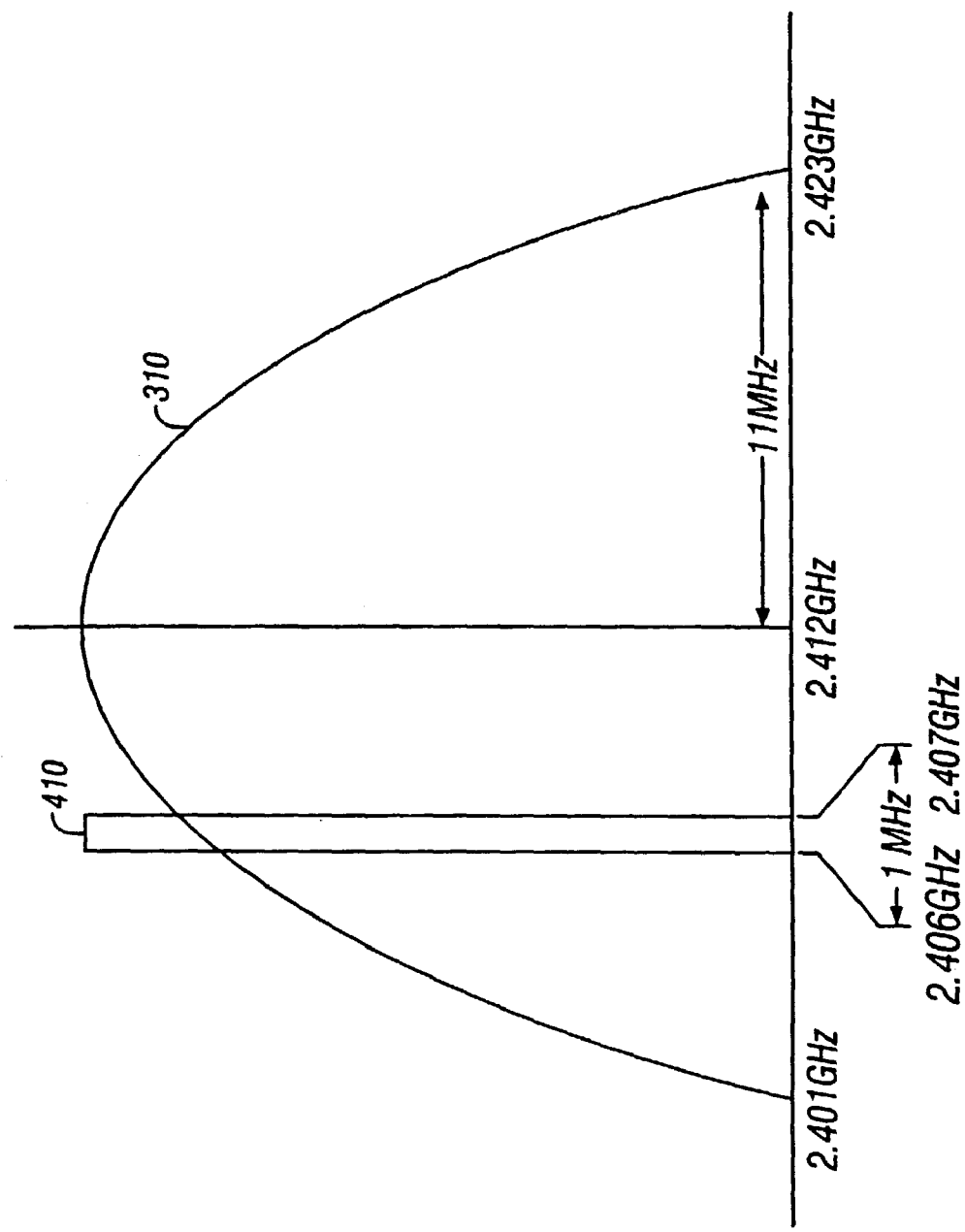
FIG. 4 is a schematic illustration of an example frequency hopping spread spectrum (FHSS) channel in an interference zone.
Figure 5:
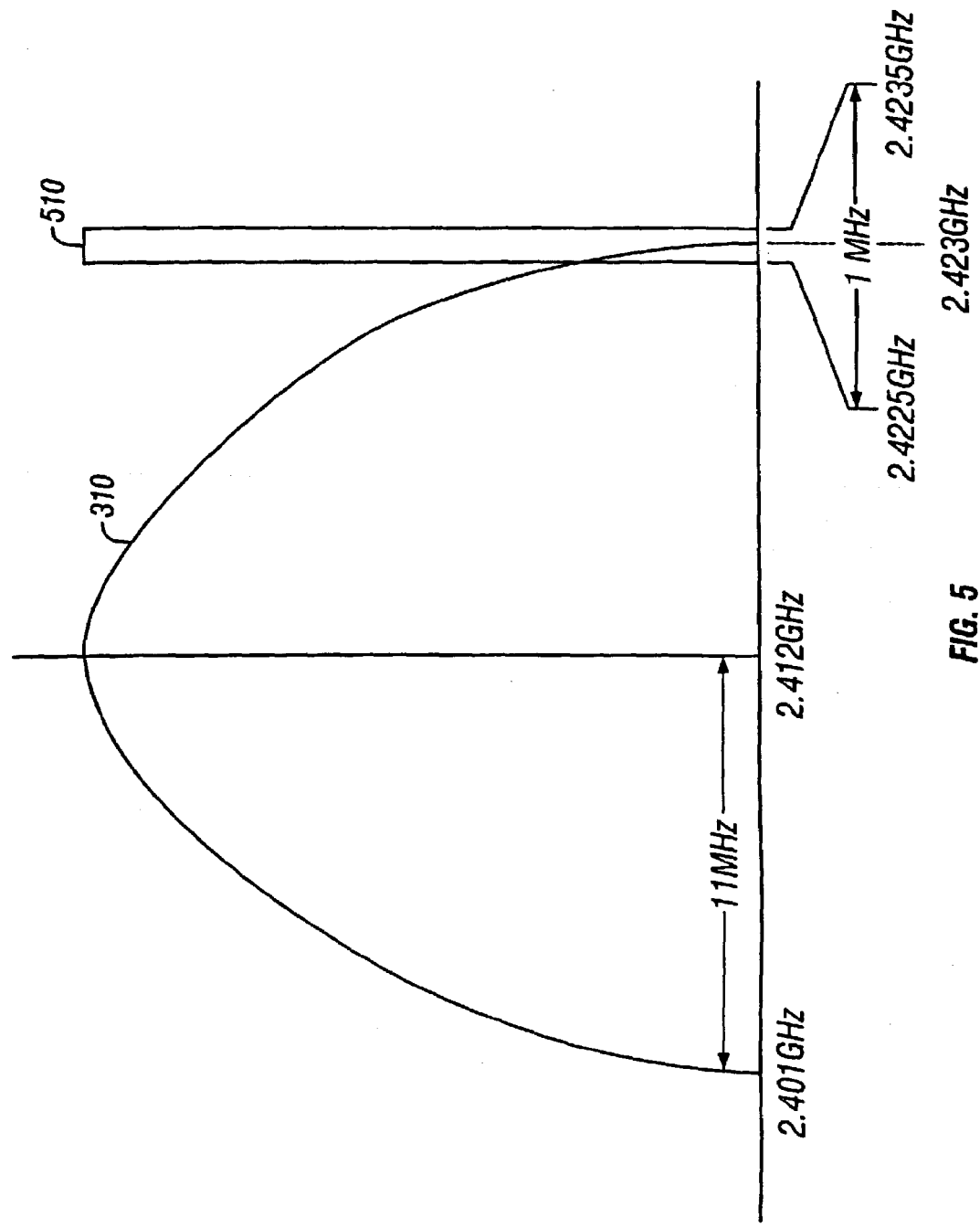
FIG. 5 is a schematic illustration of another example FHSS channel in the interference zone.
Figure 6:
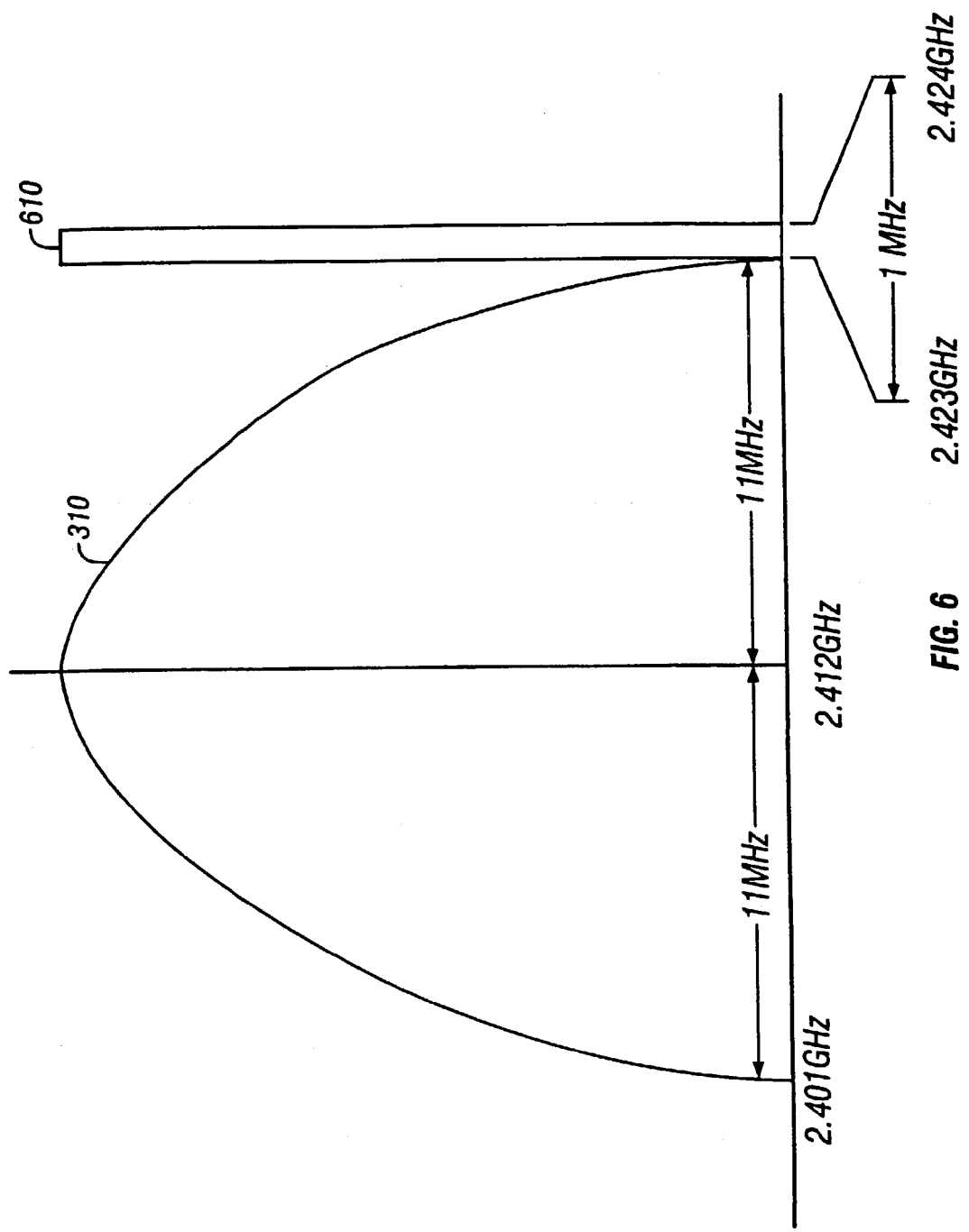
FIG. 6 is a schematic illustration of still another example FHSS channel in the interference zone.
Figure 7:
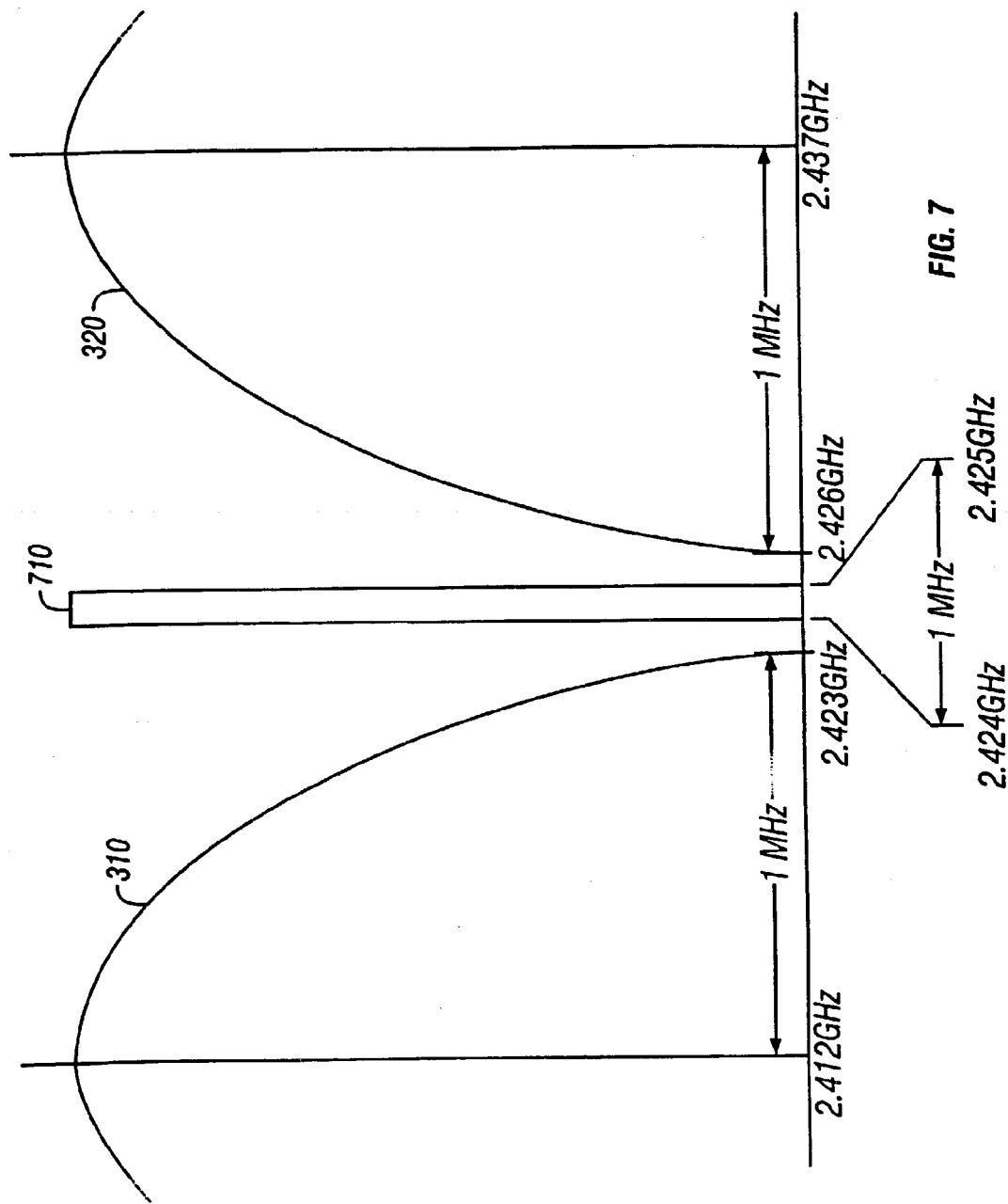
FIG. 7 is a schematic illustration of yet another example FHSS channel in the interference zone.

Persons of ordinary skill in the art will appreciate that the Bluetooth transceiver system may use an FHSS algorithm to select the FHSS channel. In particular, the FHSS algorithm may provide the Bluetooth transceiver system with a radio channel having a bandwidth of 1 MHz in the 2.4 GHz ISM frequency band for communication. Thus, there may be radio interference between the 802.11b transceiver system and the Bluetooth transceiver system 220 because the FHSS channel may be in the interference zone of the DSSS channel. Referring to FIG. 4, for example, the FHSS channel 410 extending from 2.406 to 2.407 GHz is within the DSSS channel 310. As a result, the FHSS 410 may be in the interference zone of the DSSS channel 310. In another example, the FHSS channel 510 shown in FIG. 5 extends from 2.4225 to 2.4235 GHz. The FHSS channel 510 may be in the interference zone of the DSSS channel 310 because the FHSS channel 510 overlaps the DSSS channel 310 (i.e., from 2.4225 to 2.423 GHz). As shown in FIG. 6, the FHSS channel 610 extends from 2.423 to 2.424 GHz. Although, the FHSS channel 610 is adjacent to the DSSS channel 310, the FHSS channel 610 may still be in the interference zone of the DSSS 310 because marginal radio interference may exist with the FHSS 610 being on the edge of the DSSS channel 310. Further, marginal radio interference may exist with the FHSS channel 710 being substantially proximate to the DSSS channel 310 as shown in FIG. 7. As a result, the FHSS channel 710 may also be in the interference zone of the DSSS channel 310.

If the FHSS channel is not in the interference zone of the DSSS channel (e.g., the FHSS channel does not overlap the DSSS channel and the FHSS channel is not substantially proximate to the DSSS channel) then the Bluetooth transceiver system 220 may operate the FHSS channel to communicate with other electronic devices or networks in the wireless communication system 100 such as a PDA (one shown as 134 in FIG. 1). On the other hand, if the FHSS channel is in the interference zone of the DSSS channel as described above then the electronic device 110 may determine whether the DSSS channel is active for communication associated with the 802.11b transceiver system 210 based on the operation mode of the DSSS channel. For example, the electronic device 110 may determine whether the DSSS channel is active for communication associated with the 802.11b transceiver system 210 if the frequency band of the FHSS channel (shown as 410 in FIG. 4) is within the frequency band of the DSSS channel 310.

When the FHSS channel is in the interference zone, but the operation mode of the DSSS channel is inactive (i.e., the 802.11b transceiver system 210 is not using and/or is not intending to use the DSSS channel for communication), the Bluetooth transceiver system 220 may use the FHSS channel for communication. In contrast, when the operation mode of the DSSS channel is active (i.e., the 802.11b transceiver system 210 is using and/or is intending to use the DSSS channel for communication), the electronic device 110 may determine whether communication associated with the 802.11b transceiver system 210 has priority over communication associated with the Bluetooth transceiver system 220. When the communication associated with the 802.11b transceiver system 210 has higher priority than the communication associated with the Bluetooth transceiver system 220, the Bluetooth transceiver system 220 may suspend its communication via the FHSS channel. For example, the Bluetooth transceiver system 210 may entirely abort its communication via the FHSS channel or wait until the communication associated with the 802.11b transceiver system 210 via the DSSS channel is completed before using the FHSS channel to communicate with other devices or networks in the wireless communication system 100.

If the communication associated with the Bluetooth transceiver system 220 has higher priority than the communication associated with the 802.11b transceiver system 210 then the Bluetooth transceiver system 220 may transmit a Bluetooth operating signal to the 802.11b transceiver system 210. In particular, the Bluetooth operating signal may indicate that the communication associated with the Bluetooth transceiver system 220 has higher priority than the communication associated with the 802.11b transceiver system 210. In response to the Bluetooth operating signal, the 802.11b transceiver system 210 may suspend its communication via the DSSS channel to avoid interference with the communication associated with the Bluetooth transceiver system 220. That is, the 802.11b transceiver system 210 may entirely abort its communication via the DSSS channel or wait until the communication associated with the Bluetooth transceiver system 220 via the FHSS channel is completed to communicate via the DSSS channel again. As a result, radio interference between the 802.11b transceiver system 210 and the Bluetooth transceiver system 220 may be mitigated.

Figure 8:
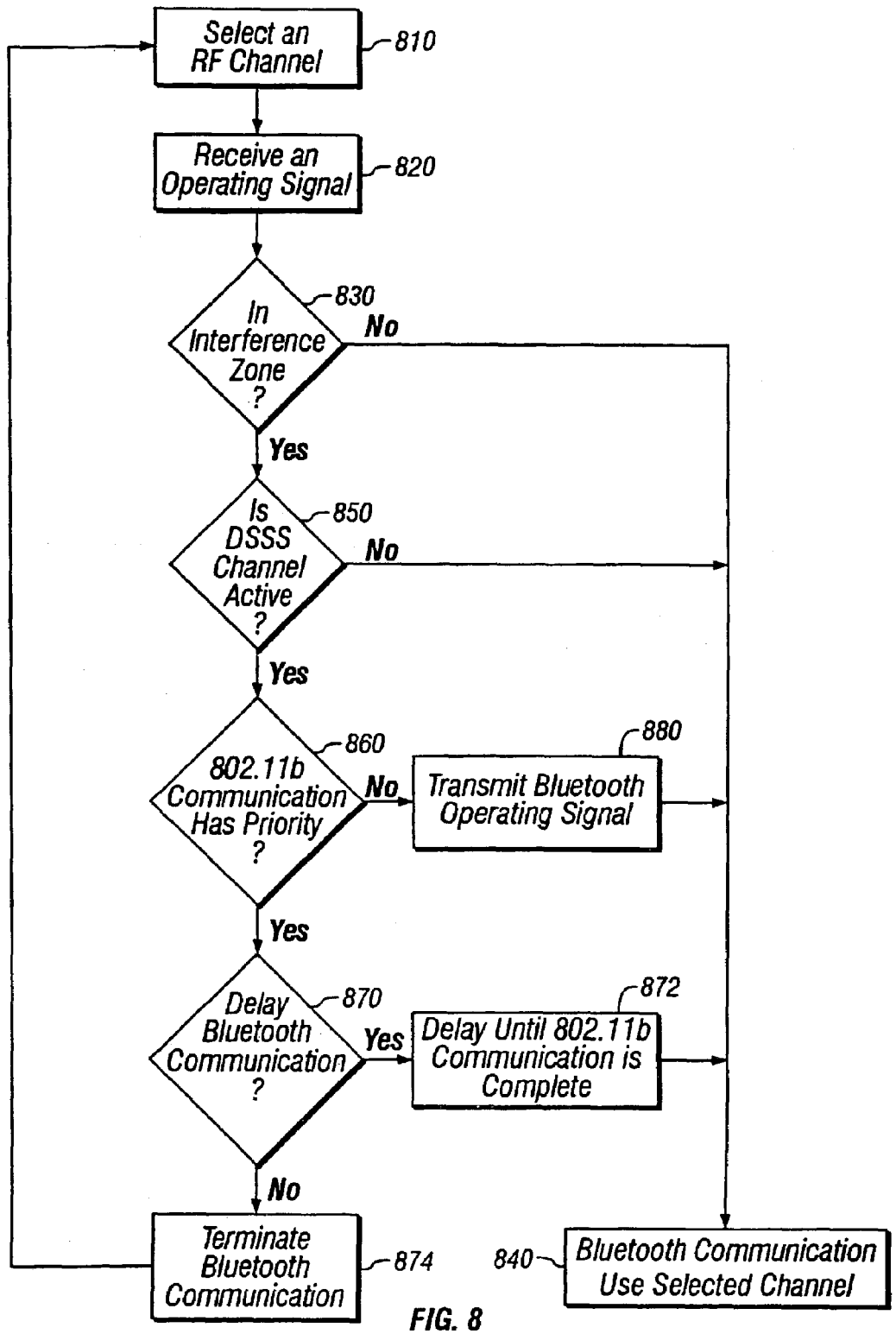
FIG. 8 is a flowchart illustrating the operation of the electronic device of FIG. 2.

One possible implementation of the computer program executed by the electronic device 110 to provide the environments reflected in FIG. 1 is illustrated in FIG. 8. Persons of ordinary skill in the art will appreciate that the computer program can be implemented in any of many different ways utilizing any of many different programming codes stored on any of many tangible mediums such as a volatile or non-volatile memory or other mass storage device (e.g., a floppy disk, a compact disc (CD), and a digital versatile disc (DVD)). Thus, although a particular order of steps is illustrated in FIG. 8, persons of ordinary skill in the art will appreciate that these steps can be performed in other temporal sequences. Again, the flow chart is merely provided as an example of one way to program the electronic device 110 to communicate via a radio channel to reduce interference between the first and second transceiver systems 210, 220 within the electronic device 110.

Assuming that the electronic device 110 includes an 802.11b transceiver system and a Bluetooth transceiver system as described above, the Bluetooth transceiver system uses a spread spectrum technique such as the FHSS algorithm to select a radio channel for communication, i.e., an FHSS channel (block 810 of FIG. 8). Persons of ordinary skill in the art will readily appreciate that the 802.11b transceiver system may use a well known direct sequence spread spectrum (DSSS) algorithm to select a radio channel for communication (i.e., a DSSS channel). At block 820, the Bluetooth transceiver system also receives an 802.11b operating signal from the 802.11b transceiver system via the wired communication link 230. The 802.11b operating signal includes channel information indicative of the DSSS channel such as, but not limited to, a reference corresponding to the DSSS channel that the 802.11b transceiver system is using and/or is intending to use for communication (e.g., a channel number), an operation mode of the DSSS channel (e.g., active or inactive), and a priority level of communication associated with the 802.11b transceiver system via the DSSS channel (e.g., low or high).

Upon selection of the FHSS channel for communication and reception of the 802.11b operating signal from the 802.11b transceiver system via the wired communication link 230, the electronic device 110 (e.g., via the Bluetooth transceiver system) determines whether the FHSS channel is available for communication associated with the Bluetooth transceiver system based on channel information indicative of the DSSS channel.

To determine whether the FHSS channel is available for communication, the electronic device 110 determines whether the FHSS channel is in an interference zone of the DSSS channel (block 830). Persons of ordinary skill in the art will appreciate that there are many ways for the electronic device 110 to determine whether the FHSS channel is in an interference zone of the DSSS channel as shown in FIGS. 4, 5, 6 and 7. For example, the electronic device 110 may use a look-up table to determine whether the FHSS channel is in the interference zone with the DSSS channel based on the channel number of the DSSS channel. In another example, the electronic device 110 may use hardware components such as, but not limited to, a comparator, to determine whether the bandwidth of FHSS channel is in the interference zone of the bandwidth of the DSSS channel.

Referring back to FIG. 8, when the FHSS channel is not in the interference zone of the DSSS channel, the Bluetooth transceiver system may use the FHSS channel to communicate with other electronic devices, human interface devices, access points, etc. within the wireless communication system 100 (block 840). If the FHSS channel is in the interference zone of the DSSS channel, control proceeds to block 850. At block 850, the electronic device 110 (e.g., via the Bluetooth transceiver system) determines whether the 802.11b transceiver system is using and/or is intending to use the DSSS channel for communication (e.g., transmission and/or reception of a signal by the 802.11b transceiver system) based on the operating mode of the DSSS channel. When the electronic device 110 detects that the DSSS channel is inactive (i.e., the 802.11b transceiver system is not using and/or is not intending to use the DSSS channel), the Bluetooth transceiver system may use the selected RF channel for communication as described above (block 840).

If the electronic device 110 detects that the DSSS channel is active (i.e., the 802.11b transceiver system is using and/or is intending to use the DSSS channel), control continues to block 860. At block 860, the electronic device 110 determines whether communication associated with the 802.11b transceiver system via the DSSS channel has higher priority than the communication associated with the Bluetooth transceiver system via the FHSS channel. For example, a high priority communication associated with the 802.11b transceiver system may be, but is not limited to, an acknowledgement of a reception of data packets, a CTS (clear-to-send) reception, and a beacon reception. When the electronic device 110 detects that the communication associated with 802.11b transceiver system via the DSSS channel has higher priority (block 860), the electronic device 110 may determine whether to suspend the communication associated with the Bluetooth transceiver system via the FHSS channel until the 802.11b communication is complete (block 870). For example, the Bluetooth transceiver system may wait and delay its communication via the FHSS channel (block 872).

Alternatively, the Bluetooth transceiver system may entirely terminate its communication via the FHSS channel (block 874), and control returns to block 810 to select another radio channel for communication.

If the electronic device 110 detects that the communication associated with the Bluetooth transceiver system via the FHSS channel has higher priority than the communication associated with the 802.11b transceiver system via the DSSS channel, control proceeds to block 880. At block 880, the Bluetooth transceiver system may transmit a Bluetooth operating signal (i.e., a priority signal) to the 802.11b transceiver system, and control continues to block 840. The Bluetooth operating signal indicates that the communication associated with the Bluetooth transceiver system via the FHSS channel has priority over the communication associated with the 802.11b transceiver system via the DSSS channel. A high priority communication associated with the Bluetooth transceiver system may be, but is not limited to, device discovery, connection establishment, connection maintenance, and human interface device (HID) profile. In response to the Bluetooth operating signal, the 802.11b transceiver system may delay or entirely terminate its communication via the DSSS channel. As a result, radio interference between the Bluetooth transceiver system and the 802.11b transceiver system may be reduced by scheduling communication via the FHSS channel and the DSSS channel.

Figure 9:
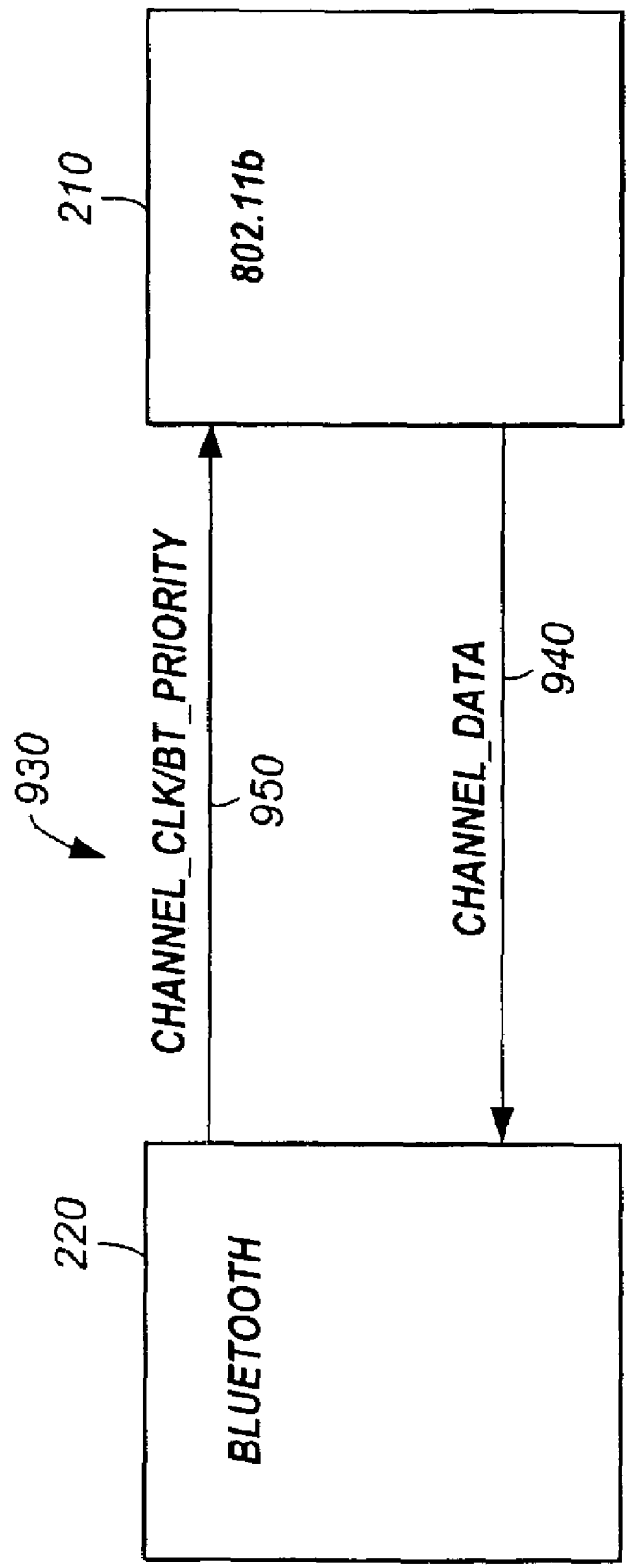
FIG. 9 is a block illustration of a two-wire interface between transceiver systems.

As noted above, the 802.11b transceiver system 210 and the Bluetooth transceiver system 220 may be operatively coupled to each other via a communication link 230 (shown in FIG. 2). The communication link 230 may be, but is not limited to, a wire interface (e.g., a hardwire link) and a wireless link (e.g., a radio link or an infrared link). The communication link 230 may include a plurality of paths so that the transceiver systems (shown as 210 and 220) may communicate with each other. To illustrate this concept, the communication link 230 may be a two-wire interface 930 as shown in FIG. 9. In particular, the two-wire interface 930 includes a channel data line 940 and a channel clock line 950. The 802.11b transceiver system 210 may transmit a channel data signal (shown as CHANNEL_DATA) via the channel data line 940 so that the Bluetooth transceiver system 220 may receive channel information from the 802.11b transceiver system 210. As described detail below, channel information may be, but is not limited to, a four-bit code indicative of a radio channel associated with the 802.11b transceiver system 210. In response to the channel data signal from the 802.11b transceiver system 210 via the channel data line 940, the Bluetooth transceiver system 220 may transmit a channel clock signal (shown as CHANNEL_CLK) via the channel clock line 950.

Figure 10:
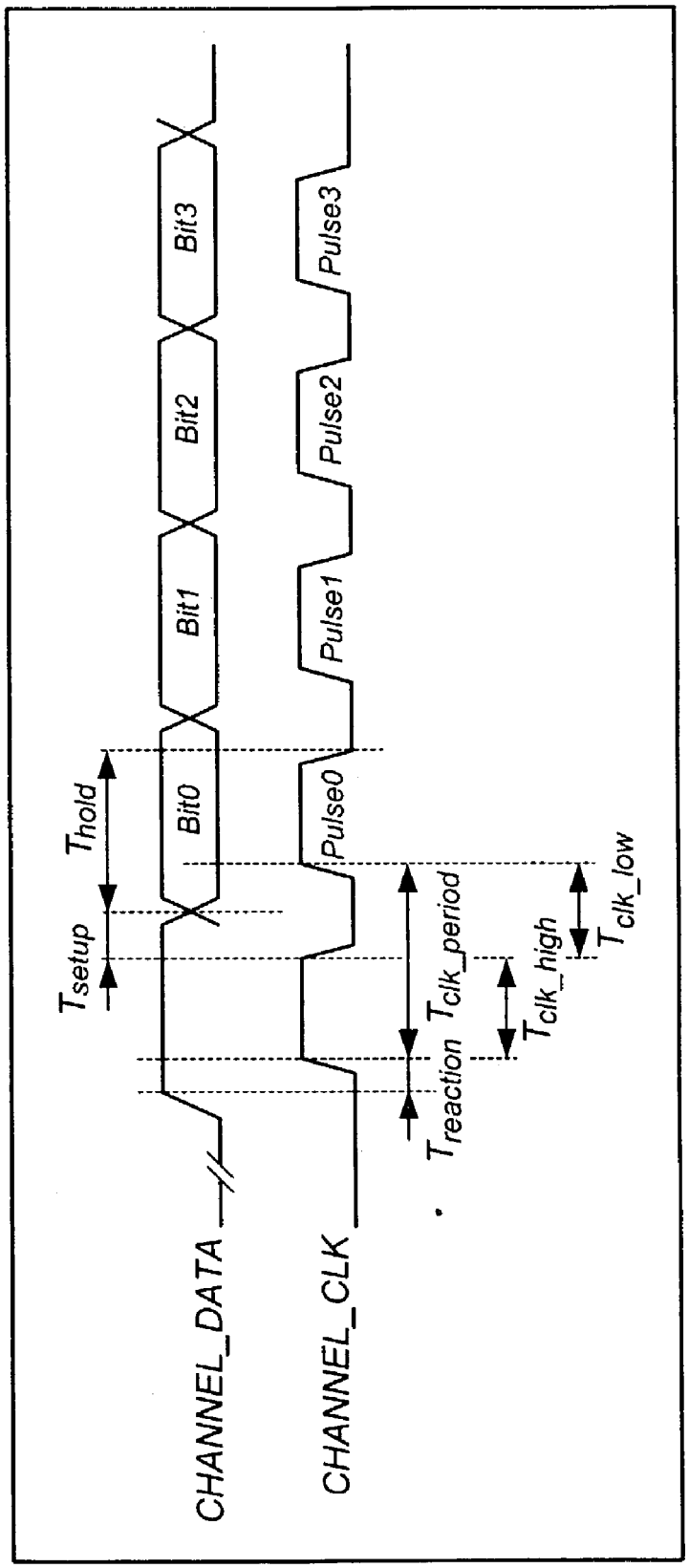
FIG. 10 is a timing illustration of communication of channel information via the two-wire interface.

Referring to FIG. 10, for example, the Bluetooth transceiver system 220 may monitor the channel data line 940 for CHANNEL_DATA. Upon detecting a rising edge of CHANNEL_DATA (i.e., the beginning of START BIT), the Bluetooth transceiver system 220 may start the channel clock line 950 within a reaction time period $T_{reaction}$ to sample CHANNEL_DATA with a clock pulse $T_{clk\_period}$. The Bluetooth transceiver system 220 may sample CHANNEL_DATA at a rising edge of $T_{clk\_high}$ of the clock pulse $T_{clk\_period}$ (i.e., when CHANNEL_CLK goes to a high state at the beginning of $T_{clk\_high}$). In particular, the clock pulse $T_{clk\_period}$ may include $T_{clk\_high}$ and $T_{clk\_low}$. Accordingly, the 802.11b transceiver system 210 may prepare to transmit channel information during $T_{setup}$ after a falling edge of $T_{clk\_low}$ of the clock pulse $T_{clk\_period}$ (i.e., when CHANNEL_CLK goes to a low state at the beginning of $T_{clk\_low}$). The Bluetooth transceiver system 220 may transmit four additional clock pulses to receive a four-bit code indicative of a radio channel associated with the 802.11b transceiver system 210 (e.g., a radio channel currently in use by the 802.11b transceiver system 210).

After the START BIT, the 802.11b transceiver system 210 may transmit the channel number corresponding to the radio channel currently in use by the 802.11b transceiver system 210 to the Bluetooth transceiver system 220. For example, the channel number may be a four-bit code, generally shown as Bit0, Bit1, Bit2, and Bit3, transmitted by the 802.11b transceiver system 210. The Bluetooth transceiver system 220 may transmit four clock pulses, generally shown as Pulse0, Pulse1, Pulse2, and Pulse3, to read Bit0, Bit1, Bit2, and Bit3, respectively. At the end of Bit3, the 802.11b transceiver system 210 may set CHANNEL_DATA to a low state until it is ready to transmit new channel information to the Bluetooth transceiver system 220.

Persons of ordinary skill in the art will readily recognize that the 802.11b communication protocol defines 14 "center frequency channels" (i.e., DSSS channels) within the ISM 2.4 GHz frequency band. To illustrate the concept of a four-bit code to represent channel information associated with the 802.11b transceiver system, the scheme shown in FIG. 11 may be implemented. As an example, the 0000 channel code may indicate that all channels may be available to the Bluetooth transceiver system 220 for communication. Accordingly, a priority signal from the Bluetooth transceiver system 220, if any, may be ignored by the 802.11b transceiver system 210.

Figure 12:
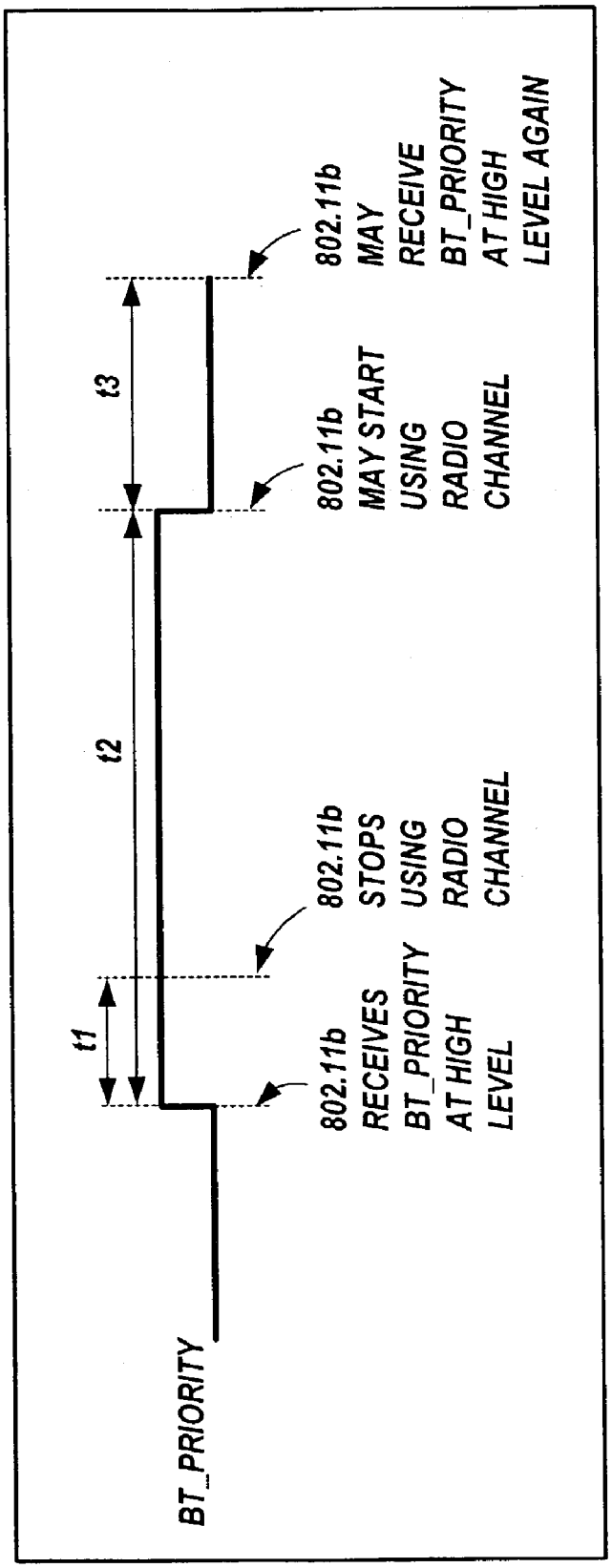
FIG. 12 is a timing illustration of communication of priority information via the two-wire interface.

Turning to the priority signal, the Bluetooth transceiver system 220 may transmit the priority signal via the channel clock line 950 when the channel clock line 950 is not used to obtain channel information from the 802.11b transceiver system 210. That is, the Bluetooth transceiver system 220 may use the channel clock line 950 to transmit either the channel clock signal (shown as CHANNEL_CLK in FIG. 10) or the priority signal. Because the 802.11b transceiver system 210 has priority as a default, the Bluetooth transceiver system 220 may use the priority signal to override the default. The priority signal may include information associated with a high priority communication such as, but not limited to, device discovery, connection establishment, connection maintenance, and human interface device (HID) profile. Referring to FIG. 12, for example, the 802.11b transceiver system 210 may sample the channel clock line 950 and receive the priority signal (shown as BT_PRIORITY) from the Bluetooth transceiver system 220 at the beginning of time period t1. In response to BT_PRIORITY being at a high state, the 802.11b transceiver system 210 may suspend all non-critical communication via the radio channel by the end of the time period t1 (i.e., the time period t1 is the maximum time for the 802.11b transceiver system 210 to react to the priority signal from the Bluetooth transceiver system 220). The Bluetooth transceiver system 220 may keep BT_PRIORITY at a high state for time period t2. At the end of the time period t2, the 802.11b transceiver system 210 may resume communication via the radio channel (i.e., the time period t2 is the maximum amount of time for the Bluetooth transceiver system 220 to transmit its priority signal). For the duration of time period t3, BT_PRIORITY is at a low state before going to a high state again. That is, the Bluetooth transceiver system 220 waits through the time period t3 before it may transmit another priority signal to the 802.11b transceiver system 210 via the channel clock line 950.

During transmission of the priority signal, the Bluetooth transceiver system 220 may monitor the channel data line 940 for an indication from the 802.11b transceiver system 210 of a channel data signal. To receive the channel data signal, the Bluetooth transceiver system 220 may delay and/or terminate the transmission of the priority signal and prepare to receive the channel data signal from the 802.11b transceiver system 210 via the channel data line 940. Accordingly, the Bluetooth transceiver system 220 may proceed to sample the channel data line 940 prior to receiving the four-bit channel code as described above.

Figure 13:
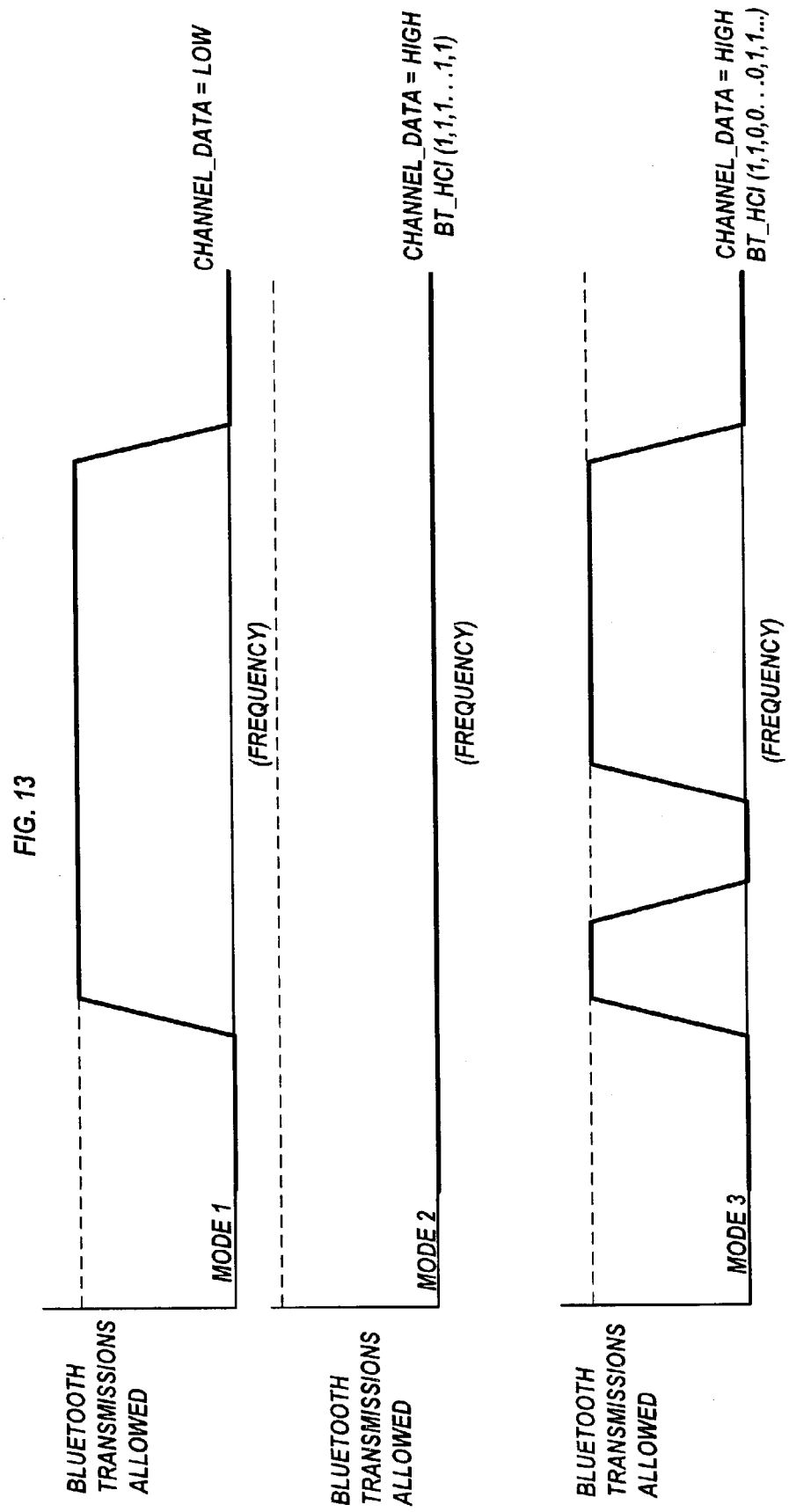
FIG. 13 is a timing illustration of a transceiver system.

The Bluetooth transceiver system 220 may operate in a variety of modes based on the channel data line 940 and a host controller interface (HCI) command (shown as BT_HCI in FIG. 13). For example, the HCI command may be, but is not limited to, an 80 bit code [0:79] to designate a FHSS channel operable by the Bluetooth transceiver system 220 for communication. When the channel data line 940 is at a low state, the Bluetooth transceiver system 220 may be allowed to use any of the 79 FHSS channels regardless of the HCI command (shown as mode 1). Here, the 802.11b transceiver system 210 may be inactive (i.e., turned off or operating in a power saving mode).

When the channel data line 940 is at a high state, however, the Bluetooth transceiver system 220 may operate to avoid either one of or all 14 radio channels operable by the 802.11b transceiver system 210 (i.e., DSSS channels) based on the HCI command. In particular, each parameter of the HCI command may all be at a high state (i.e., BT_HCI (1, 1, 1 . . . 1, 1)) so that the Bluetooth transceiver system 220 may avoid all of the DSSS channels because a communication link associated with the 802.11b transceiver system 210, for example, may be lost (shown as mode 2). To reestablish that communication link, the 802.11b transceiver system 210 may need to select from all of the DSSS channels. Alternatively, the HCI command may instruct to the Bluetooth transceiver system 220 to avoid a particular DSSS channel (e.g., BT_HCI (1, 1, 0, 0 . . . 0, 1, 1 . . . 1)) because the DSSS channel, for example, may be currently in use by the 802.11b transceiver system 210 (shown as mode 3).

Figure 14:
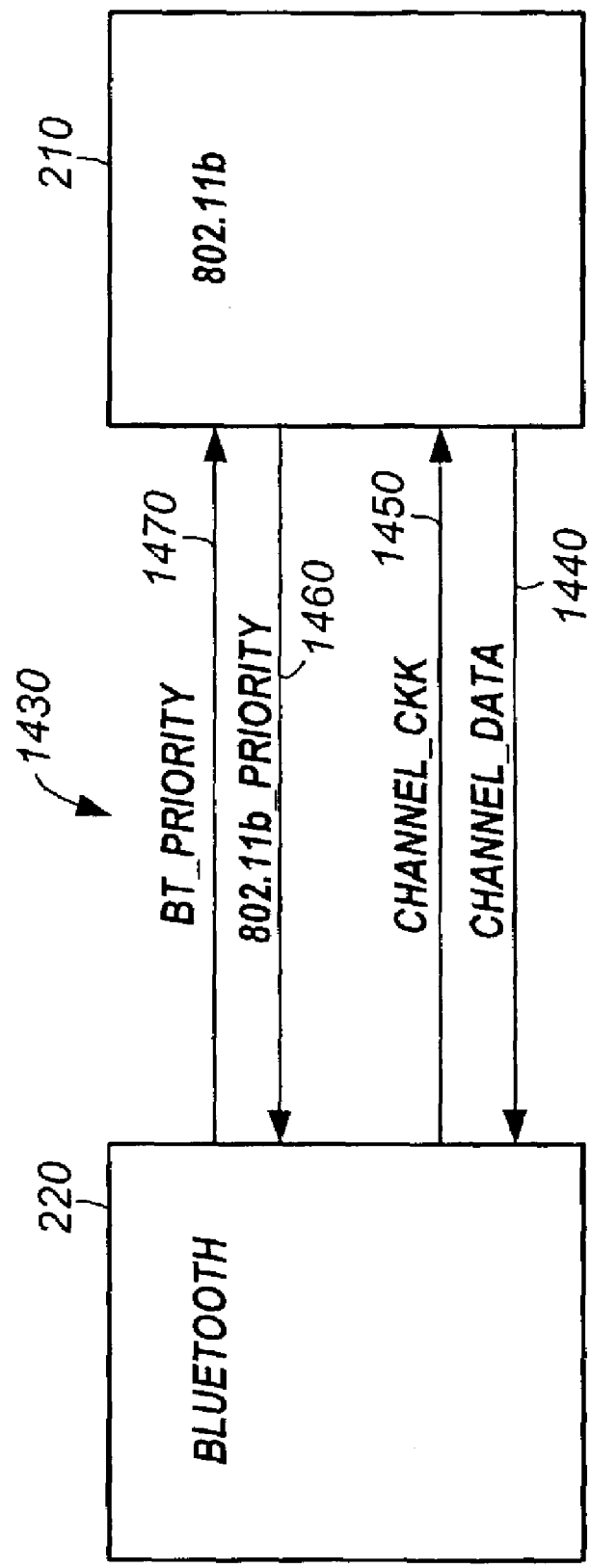
FIG. 14 is a block illustration of a four-wire interface between transceiver systems.

Referring to FIG. 14, another example of the wired communication link 230 is shown. The wired communication link 230 may be a four-wire interface 1430 including a channel data line 1440, a channel clock line 1450, a first priority line 1460, and a second priority line 1470. The channel data line 1440 and the channel clock line 1450 may operate similar to the channel data line 940 and the channel clock line 950 as described above, respectively. However, the Bluetooth transceiver system 220 may not use the channel clock line 1450 to transmit the priority signal. Instead, the second priority line 1470 may be used to relay the priority signal (i.e., BT_PRIORITY) from the Bluetooth transceiver system 220 to the 802.11b transceiver system 210 in a similar fashion as shown in FIG. 12. In turn, the 802.11b transceiver system 210 may also transmit a priority signal (i.e., 802.11b_PRIORITY) to the Bluetooth transceiver system 220 via the first priority line 1460.

Figure 15:
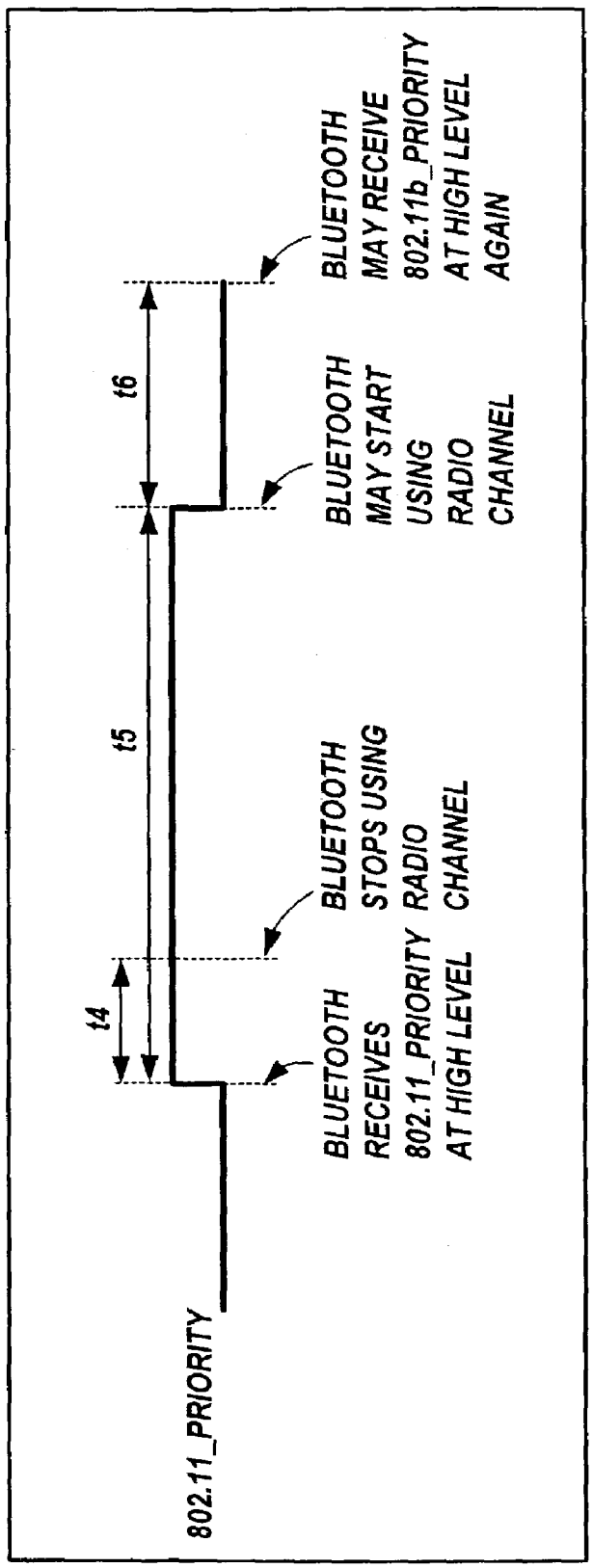
FIG. 15 is a timing illustration of communication of priority information via the four-wire interface.

In particular, the Bluetooth transceiver system 220 may receive the priority signal (shown as 802.11b_PRIORITY) from the 802.11b transceiver system 210 at the beginning of a time period t4 as shown in FIG. 15. Responsive to 802.11b_PRIORITY being at a high state, the Bluetooth transceiver system 220 may suspend all non-critical communication via the radio channel by the end of the time period t4 (i.e., the time period t4 is the maximum time for the Bluetooth transceiver system 220 to react to the priority signal from the 802.11b transceiver system 210). The 802.11b transceiver system 210 may keep 802.11b_PRIORITY at a high state for time period t5. At the end of time period t5, the Bluetooth transceiver system 220 may resume communication via the radio channel (i.e., the time period t5 is the maximum time for the 802.11b transceiver system 210 to transmit its priority signal). For the duration of time period t6, BT_PRIORITY is at a low state before going to a high state again. That is, the 802.11b transceiver system 210 may wait through the time period t6 before it may transmit another priority signal to the Bluetooth transceiver system 220 via the first priority line 1460.

As a result, the 802.11b transceiver system 210 may either communicate a radio channel currently in use by the 802.11b transceiver system 210 to the Bluetooth transceiver system 220 so that the Bluetooth transceiver system 220 may avoid all non-critical communication via the radio channel or indicate that no radio channel is currently in use by the 802.11b transceiver system 210 so that the Bluetooth transceiver system 220 may communicate via the radio channel.

Although much of the above discussion has focused on reducing radio interference between a transceiver system operating in accordance with 802.11b communication protocol and a transceiver system operating in accordance with Bluetooth communication protocol, persons of ordinary skill in the art will appreciate that transceiver systems operating in accordance with other communication protocols may be used within a wireless communication system or an electronic device such as 802.11a and 802.11g communication protocols.

Many changes and modifications to the embodiments described herein could be made. The scope of some changes is discussed above. The scope of others will become apparent from the appended claims.

What is claimed is:

1. A method comprising:
providing a first device containing a first transceiver system that transmits data using a first communication link with a first protocol and a second transceiver system that transmits data using a second communication link with a second protocol;
providing channel information from the first transceiver system to the second transceiver system via a third communication link separate from the first and second communication link, the channel information being indicative of a radio channel associated with the first transceiver system; and
providing priority information from the second transceiver system to the first transceiver system via the third communication link, the priority information being indicative of priority activity associated with the second transceiver system.

2. A method as defined in claim 1, wherein providing channel information from the first transceiver system to the second transceiver system comprises providing channel information from the first transceiver system to the second transceiver system via a first path of at least one of a wire interface or a wireless link between the first transceiver system and the second transceiver system.

3. A method as defined in claim 1, wherein providing channel information from the first transceiver system to the second transceiver system comprises providing channel information from a transceiver system operating in accordance with the Institute of Electrical and Electronic Engineers (IEEE) 802.11b communication protocol or providing channel information from a transceiver system operating in accordance with the Bluetooth communication protocol.

4. A method as defined in claim 1, wherein providing channel information from the first transceiver system to the second transceiver system comprises providing a four-bit code indicative of the radio channel associated with the first transceiver system from the first transceiver system to the second transceiver system via the third communication link.

5. A method as defined in claim 1, wherein providing channel information from the first transceiver system to the second transceiver system comprises providing channel information indicative of a direct sequence spread spectrum (DSSS) channel from the first transceiver system to the second transceiver system via the third communication link, the DSSS channel being a radio channel currently in use by the first transceiver system.

6. A method as defined in claim 1, wherein providing channel information from the first transceiver system to the second transceiver system comprises providing a host controller interface (HCI) command indicative of a frequency hopping spread spectrum (FHSS) channel from the first transceiver system to the second transceiver system via the third communication link, the FHSS channel being a radio channel operable by the second transceiver system for communication.

7. A method as defined in claim 1, wherein providing channel information from the first transceiver system to the second transceiver system comprises providing channel information from transceiver systems disposed within at least one of a laptop computer, a handheld computer, a cellular telephone, or a personal digital assistant (PDA).

8. A method as defined in claim 1, wherein providing priority information from the second transceiver system to the first transceiver system comprises providing priority information indicative of at least one of a device discovery, a connection establishment, a connection maintenance, or a human interface device (HID) profile via the second path of the communication link.

9. A method as defined in claim 1, wherein providing channel information from the first transceiver system to the second transceiver system comprises providing channel information from the first transceiver to the second transceiver system via a first path of the third communication link, and wherein providing priority information from the second transceiver system to the first transceiver system comprises providing priority information from the second transceiver system to the first transceiver system via a second path of the third communication link.

10. A method as defined in claim 1, wherein the first and second communication links are wireless links and the third communication link is a wired link.

11. A method as defined in claim 1, wherein the channel information is indicative of a radio channel associated with the first communication link of the first transceiver system, and wherein the priority information is indicative of priority activity associated with data to be communicated via the second communication link of the second transceiver system.

12. A method as defined in claim 1, wherein the first and second transceiver systems are disposed in the same device.

13. A method comprising:
providing a channel data signal from a first transceiver system to a second transceiver system via a first path of a communication link, the channel data signal including information indicative of a radio channel associated with the first transceiver system, and the first and second transceiver systems being located in the same electronic device;
providing a channel clock signal from the second transceiver system to the first transceiver system via a second path of the communication link, the channel clock signal being used to retrieve the information indicative of the radio channel;
providing a first priority signal from the first transceiver system to the second transceiver system via a third path of the communication link, the first priority signal indicating that the first transceiver system may use the radio channel in response to priority activity associated with the first transceiver system; and
providing a second priority signal from the second transceiver system to the first transceiver system via a fourth path of the communication link, the second priority signal indicating that the second transceiver system may use the radio channel in response to priority activity associated with the second transceiver system,
wherein the communication link comprises at least one of a wire interface or a wireless link between the first transceiver system and the second transceiver system.

14. A method as defined in claim 13, wherein each of the first transceiver system and the second transceiver system comprises a transceiver system operating in accordance with the Institute of Electrical and Electronic Engineers (IEEE) 802.11b communication protocol or a transceiver system operating in accordance with the Bluetooth communication protocol.

15. A method as defined in claim 13, wherein providing the channel data signal from the first transceiver system to the second transceiver system comprises providing a four-bit code indicative of the radio channel associated with the first transceiver system from the first transceiver system to the second transceiver system via the first path of the communication link.

16. An electronic device comprising:
a communication link having at least two paths;
a first transceiver system configured to provide channel information indicative of a radio channel associated with the first transceiver system: via a first path of the communication link; and
a second transceiver system in communication with the first transceiver system via the communication link, the second transceiver system being configured to provide priority information indicative of priority activity associated with the second transceiver system via a second path of the communication link, wherein the first transceiver system is configured to transmit priority information indicative of priority activity associated with the first transceiver system via a third path of the communication link, and wherein the second transceiver system is configured to transmit a clock pulse to initiate transmission of channel information from the first transceiver system via a fourth path of the communication link.

17. An electronic device as defined in claim 16, wherein the communication link comprises at least one of a wire interface or a wireless link.

18. An electronic device as defined in claim 16, wherein the first transceiver system is a transceiver system operating in accordance with the Institute of Electrical and Electronic Engineers (IEEE) 802.11b communication protocol, and the second transceiver system is a transceiver system operating in accordance with the Bluetooth communication protocol.

19. An electronic device as defined in claim 16, wherein the channel information includes a four-bit code indicative of the radio channel associated with the first transceiver system.

20. An electronic device as defined in claim 16, wherein the channel information comprises a host controller interface (HCI) command indicative of a radio channel operable by the second transceiver system for communication.

21. An electronic device as defined in claim 16, wherein the electronic device comprises at least one of a laptop computer, a handheld computer, a cellular telephone, or a personal digital assistant (PDA).

22. In an electronic device including a first transceiver system and a second transceiver system, a computer program embodied on a computer-readable medium and configured to be executed by a processor, the computer program comprising:

a first routine configured to direct the processor to provide channel information from the first transceiver system to the second transceiver system via a first path of a communication link, the communication link comprising at least two paths, and the channel information being indicative of a radio channel associated with the first transceiver system;

a second routine configured to direct the processor to provide priority information from the second transceiver system to the first transceiver system via a second path of the communication link, the priority information being indicative of priority activity associated with the second transceiver system;

a third routine configured to direct the processor to provide priority information from the first transceiver system to the second transceiver system via a third path of the communication link, the priority information being indicative of priority activity associated with the first transceiver system; and a fourth routine configured to direct the processor to provide a clock pulse from the second transceiver system to the first transceiver system via a fourth path of the communication link, the clock pulse being configured to initiate transmission of channel information from the first transceiver system to the second transceiver system via the first path of the communication link.

23. A computer program as defined in claim 22, wherein the communication link comprises at least one of a wire interface or a wireless link.

24. A computer program as defined in claim 22, wherein the first routine is configured to direct the processor to provide channel information from a transceiver system operating in accordance with the Institute of Electrical and Electronic Engineers (IEEE) 802.11b communication protocol to a transceiver system operating in accordance with the Bluetooth communication protocol via the first path of the communication link.

25. A computer program as defined in claim 22, wherein the first routine is configured to direct the processor to provide a four-bit code indicative of the radio channel associated with the first transceiver system from the first transceiver system to the second transceiver system via the first path of the communication link.

26. A computer program as defined in claim 22, wherein the first routine is configured to direct the processor to provide a host controller interface (HCI) command from the first transceiver system to the second transceiver system via the first path of the communication link, the HCI command being indicative of a radio channel operable by the second transceiver system for communication.

27. A computer program as defined in claim 22, wherein the electronic device comprises at least one of a laptop computer, a cellular telephone, or a personal digital assistant (PDA).

28. A computer program as defined in claim 22, wherein the computer-readable medium comprises at least one of paper, a programmable gate array, application specific integrated circuit, erasable programmable read only memory, read only memory, random access memory, magnetic media, or optical media.

29. A system comprising:

a communication link having at least two paths;

a first transceiver system configured to provide channel information indicative of a radio channel associated with the first transceiver system via a first path of the communication link; and a second transceiver system in communication with the first transceiver system via the communication link, the second transceiver system being configured to provide priority information indicative of priority activity associated with the second transceiver system via a second path of the communication link, wherein the first transceiver system is configured to transmit priority information indicative of priority activity associated with the first transceiver system via a third path of the communication link, and wherein the second transceiver system is configured to transmit a clock pulse via a fourth path of the communication link, the clock pulse being configured to initiate transmission of channel information from the first transceiver system.

30. A system as defined in claim 29, wherein the communication link comprises at least one of a wire interface or a wireless link.

31. A system as defined in claim 29, wherein the first transceiver system is a transceiver system operating in accordance with the Institute of Electrical and Electronic Engineers (IEEE) 802.11b communication protocol, and the second transceiver system is a transceiver system operating in accordance with the Bluetooth communication protocol.

32. A system as defined in claim 29, wherein the channel information comprises a four-bit code indicative of the radio channel.

33. A system comprising:

an antenna;

a first communication link;

a second communication link;

a third communication link, separate from the first and second communication links;

a first transceiver system operatively coupled to the antenna, the first transceiver system being configured to provide channel information indicative of a radio channel associated with the first transceiver system via the third communication link; and a second transceiver system operatively coupled to the antenna and in communication with the first transceiver system via the communication link, the second transceiver system being configured to provide priority information indicative of priority activity associated with the second transceiver system via the third communication link, wherein the first transceiver system is a transceiver system operating in accordance with the Institute of Electrical and Electronic Engineers (IEEE) 802.11b communication protocol using the first communication link, and the second transceiver system is a transceiver system operating in accordance with the Bluetooth communication protocol using the second communication link.

34. A system as defined in claim 33, wherein the communication link comprises at least one of a wire interface or a wireless link.

35. A system as defined in claim 33, wherein the channel information comprises a four-bit code indicative of the radio channel.

36. A system as defined in claim 33, wherein the first transceiver system is configured to provide channel information indicative of a radio channel associated with the first transceiver system via a first path of the third communication link and the second transceiver system is configured to provide priority information indicative of priority activity associated with the second transceiver system via a second path of the third communication link.

37. A system as defined in claim 36, wherein the first transceiver system is configured to transmit priority information indicative of priority activity associated with the first transceiver system via a third path of the communication link, and wherein the second transceiver system is configured to transmit a clock pulse via a fourth path of the communication link, the clock pulse being configured to initiate transmission of channel information from the first transceiver system to the second transceiver system.

38. A system comprising:
a connecting means having at least two paths;
a first means different from the connecting means and configured to transmit and receive information via a first protocol, the first means being further configured to provide channel information indicative of a radio channel associated with the first means via at least one of the at least two paths of the connecting means; and
a second means different from the connecting means and configured to transmit and receive information via a second protocol, the second means in communication with the first means via the connecting means and configured to provide priority information indicative of priority activity associated with the second means via at least one of the at least two paths of the connecting means,
wherein the first means is configured to transmit and receive information separate from the at least two paths of the connecting means, the second means is configured to transmit and receive information separate from the at least two paths of the connecting means.

39. A system as defined in claim 38, wherein the first means is configured to provide a four-bit code indicative of the radio channel from the first means to the second means via the first path of the connecting means.

40. A system as defined in claim 38, wherein the first means is configured to provide a host controller interface (HCI) command indicative of a frequency hopping spread spectrum (FHSS) channel to the second means via the first path of the connecting means, the FHSS channel being a radio channel operable by the second means for communication.

41. A system as defined in claim 38, wherein the first means is configured to provide channel information indicative of a radio channel associated with the first means via a first path of the connecting means and the second means being configured to provide priority information indicative of priority activity associated with the second means via a second path of the connecting means.

42. A system as defined in claim 38, wherein the connecting means comprises at least one of a wire interface or a wireless link between the first means and the second means.

* * * * *